United States Patent [19]

Ueno

[11] Patent Number: 5,742,381
[45] Date of Patent: Apr. 21, 1998

[54] APPARATUS FOR MEASURING REFRACTIVE POWER AND RADIUS OF CURVATURE OF A LENS

[75] Inventor: Yasunori Ueno, Kawasaki, Japan

[73] Assignee: Nikon Corporation, Tokyo, Japan

[21] Appl. No.: 739,270

[22] Filed: Oct. 29, 1996

[30] Foreign Application Priority Data

Nov. 15, 1995 [JP] Japan ................................. 7-321023

[51] Int. Cl.$^6$ ................................................. G01B 9/00
[52] U.S. Cl. ......................................... 356/124; 356/127
[58] Field of Search .................................... 356/124–127

[56] References Cited

U.S. PATENT DOCUMENTS

| | | | |
|---|---|---|---|
| 4,534,645 | 8/1985 | Nohda | 356/125 |
| 4,572,628 | 2/1986 | Nohda | 351/212 |
| 5,432,596 | 7/1995 | Hayashi | 356/124 |

*Primary Examiner*—Frank G. Font
*Assistant Examiner*—Amanda Merlino

*Attorney, Agent, or Firm*—Klarquist Sparkman Campbell Leigh & Whinston, LLP

[57] ABSTRACT

Apparatus and methods for measuring refractive power and radius of curvature of a lens are disclosed. The apparatus comprises a refractive-power measurement subsystem in combination with a curvature-radius measurement subsystem. Each subsystem has its own optical axis and includes at least two point sources of light symmetrically situated relative to the respective optical axis in a plane perpendicular to the axis. Light fluxes from the light sources pass through or reflect from, respectively, the subject lens and impinge on a light-position sensor such as a CCD. The optical axes are preferably separate but become coaxial before reaching the light-position sensor. The refractive-index measurement subsystem senses the positions of images of the light sources on the light-position sensor as affected by refraction of light fluxes passing through the subject lens relative to positions of images obtained with no lens is being measured. The curvature-radius measurement subsystem senses the positions of images of the light sources as affected by reflection of light fluxes from the lens surface relative to positions of images obtained when the surface is planar.

19 Claims, 7 Drawing Sheets

(a)  (b)

(a)  (b)

(a)  (b)

APPARATUS FOR MEASURING REFRACTIVE POWER AND RADIUS OF CURVATURE OF A LENS

FIELD OF THE INVENTION

This invention pertains to devices and methods for measuring the refractive power and radius of curvature of lenses and other optical elements. The invention especially pertains to devices for measuring the refractive power and radius of curvature of eyeglass lenses, contact lenses, and the like.

BACKGROUND OF THE INVENTION

A representative conventional device for automatically measuring the refractive power of an optical system is disclosed in, e.g., Japan Kôkoku Patent Document No. HEI 4-34092. Such a device, as well as other devices have shortcomings that spur further innovation in this technical field.

In lens manufacturing processes, the ability to accurately and precisely measure the refractive power of the lens is crucial to quality control. In addition, the ability to measure the radius of curvature of a lens is critical in confirming whether or not each lens will exhibit a specified optical performance. Measuring the radius of curvature is especially critical in contact lenses, which are worn directly on the eye and must fit precisely.

In prior-art devices and methods directed to such ends, problems have arisen in that measurements of refractive power and radius of curvature were, due to shortcomings of existing equipment, performed serially using separate instruments. Such measurements were also cumbersome and time-consuming.

SUMMARY OF THE INVENTION

The foregoing shortcomings of the prior art are solved by the present invention that provides, inter alia, apparatus and methods for measuring both the refractive power and the radius of curvature of a lens.

According to one aspect of the present invention, an apparatus is provided that is operable to measure the refractive power and radius of curvature of a subject lens. A preferred embodiment of such an apparatus comprises a refractive-power measurement subsystem and a curvature-radius measurement subsystem.

The refractive-power measurement subsystem is arranged on a primary optical axis and comprises a primary light source operable to generate primary light fluxes. The primary light fluxes appear to originate from locations that are symmetrically displaced from the primary optical axis on a plane perpendicular to the primary optical axis. The refractive-power measurement subsystem also comprises, on the primary optical axis, a condenser lens, a collimator lens, an imaging lens, and a light-position sensor. For measurement, a subject lens is placed on the primary optical axis between the collimator lens and the imaging lens. The refractive power of a subject lens is measured by sensing the positions at which the primary light fluxes impinge on the light-position sensor as affected by refraction of the primary light fluxes passing through the subject lens, relative to positions at which the primary light fluxes impinge on the light-position sensor when no subject lens is placed between the collimator lens and the imaging lens.

The curvature-radius measurement subsystem is arranged on a secondary optical axis and comprises a secondary light source operable to generate plural secondary light fluxes. The secondary light fluxes appear to originate from locations that are symmetrically displaced from the secondary optical axis on a plane perpendicular to the secondary optical axis. The curvature-radius measurement subsystem also comprises, on the secondary optical axis, a condenser lens, a collimator lens, an imaging lens, and a light-position sensor. For measurement, a subject lens is placed between the collimator lens and the imaging lens such that the subject surface faces the imaging lens. The radius of curvature of the subject surface is measured by sensing the positions at which the secondary light fluxes impinge on the light-position sensor as affected by reflection of the secondary light fluxes from the subject surface, relative to positions at which the secondary light fluxes impinge on the light-position sensor when the subject surface is planar.

Preferably, the primary light fluxes, like the secondary light fluxes, appear to originate from locations that are situated on opposing sides of the respective optical axis. Further preferably, there are four primary light sources and four secondary light sources each producing a respective light flux. The light sources are preferably "point sources" such as LEDs or laser diodes.

Refractive-power data concerning a subject lens, obtained with a refractive-power measurement subsystem as summarized above, also include the decentering of the lens and the direction of the principle meridians of the lens. Similarly, curvature-radius data concerning a subject surface of a lens, obtained with a curvature-radius measurement subsystem as summarized above, also include maximum radius of curvature and minimum radius of curvature of the subject surface as well as the decentering of the lens and the direction of the principal meridians of the surface.

Further preferably, an apparatus according to the present invention includes a beam splitter situated at an intersection of the primary optical axis with the secondary optical axis. This allows the two subsystems to share the same light-position sensor and imaging lens, and also allows the primary and secondary optical axes to be coaxial between the beam splitter and the light-position sensor.

The foregoing and other features and advantages of the present invention can be ascertained by reference to the following drawings and detailed description.

DETAILED DESCRIPTION

In general, an apparatus according to the present invention comprises both a refractive-power measurement subsystem operative to measure the refractive power of a subject lens, and a curvature-radius measurement subsystem operative to measure the radius of curvature of a surface of the subject lens. The refractive-power measurement subsystem preferably utilizes at least two light fluxes for performing the measurement. The curvature-radius measurement subsystem also preferably utilizes at least two light fluxes. Preferably, the refractive-power measurement subsystem and the curvature-radius measurement subsystem are optically connected to a beam-splitter so as to permit these two subsystems to share an imaging lens and a single light-position sensor.

Figure 1:
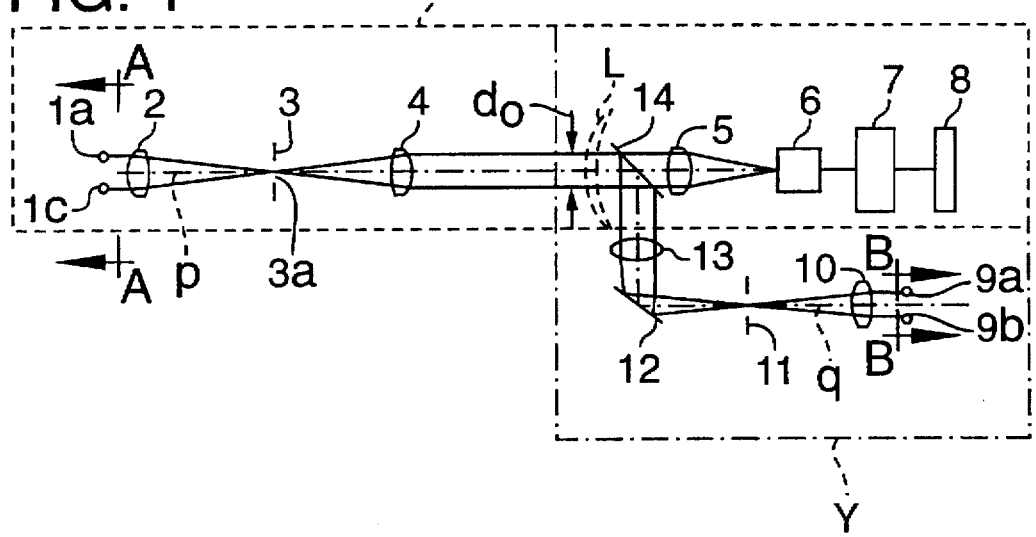
FIG. 1 is an optical diagram of the overall configuration of a preferred embodiment of an apparatus according to the present invention for measuring the refractive power and radius of curvature of a subject lens.

FIG. 1 depicts general aspects of a preferred embodiment of an apparatus according to the present invention, the apparatus having the general characteristics as outlined above. The FIG.-1 embodiment comprises a refractive-power measurement subsystem X and a curvature-radius measurement subsystem Y. As can be seen, these subsystems partially overlap in the FIG.-1 embodiment.

The refractive-power measurement subsystem X comprises multiple primary light sources $1a-1d$ (see FIG. 2), a condenser lens 2, a "pinhole" (small-diameter aperture) $3a$ defined by an aperture stop 3, a collimator lens 4, an imaging lens 5, a light-position sensor 6, a processor 7, and a display 8. The condenser lens 2, the pinhole $3a$, the collimator lens 4, the imaging lens 5, and the light-position sensor 6 are all disposed on a primary optical axis p.

Figure 2:
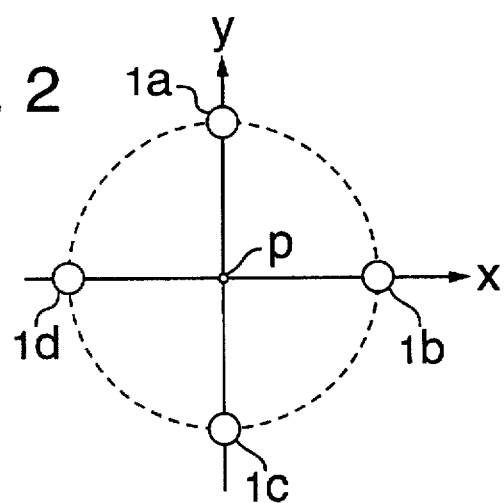
FIG. 2 schematically shows, along line A—A in FIG. 1, the relative positions of the primary light sources of the refractive-power measurement subsystem of the FIG.-1 embodiment.

FIG. 2 is a schematic transverse view along the line A—A in FIG. 1 showing the preferred arrangement of the primary light sources $1a-1d$. As can be seen, the primary light sources $1a-1d$ are situated, respectively, at equilateral positions on a circle (dashed line) centered on and perpendicular to a primary optical axis p. The diameter of the circle depends on the range of possible diameters and on the range of possible refractive powers of subject lenses to be measured. In FIG. 2, two primary light sources $1a$, $1c$ are situated on a y axis vertically intersecting the primary optical axis p, and two other primary light sources $1b$, $1d$ are situated on an x axis horizontally intersecting the primary optical axis p.

The primary light sources can be any of various light sources that are operable as "point sources" as known in the art. Preferred primary light sources are light-emitting diodes (LEDs) and laser diodes. The intensity of light produced by the primary light sources can be adjustable.

Although FIG. 2 shows four primary light sources, which is the preferred number, the actual number can be fewer or greater than four, so long as the primary light source(s) are operable to provide, either serially or simultaneously, light fluxes that emanate from more than one non-axial location on a plane perpendicular to the primary optical axis p. An example of serial production of such multiple light fluxes is represented by a single point-source strobe mounted so as to rotate on a circle (e.g., the dashed circle shown in FIG. 2) about the primary optical axis p and momentarily flash at each of the locations $1a$, $1b$, $1c$, $1d$ shown in FIG. 2. An example of simultaneous production of such multiple light fluxes is represented by four separate point sources $1a$, $1b$, $1c$, $1d$ situated as shown in FIG. 2 and that are all illuminated at the same time.

Referring further to FIG. 1, the condenser lens 2 is separated from the primary light sources $1a-1d$ by a preset distance. The pinhole $3a$ is situated at the rear focal point of the condenser lens 2. The collimator lens 4 is situated, on the opposite side of the pinhole $3a$ from the condenser lens 2, at the front focal point of the collimator lens 4. The imaging lens 5 is situated on the opposite side of the collimator lens 4 from the pinhole $3a$ a preset distance from the pinhole 3. The light-position sensor 6 is situated at the rear focal point of the imaging lens 5. A subject lens L to be tested is placed between the collimator lens 4 and the imaging lens 5.

Not intending to be limiting in any way, the light-position sensor is preferably a charge-coupled device (CCD). A CCD is especially capable of accurately sensing positional displacements of light in a plane. Any analogous device capable of performing the same function would also suffice.

The light-position sensor 6 has an output that is electrically connected to an input of a processor 7 (such as a computer). A display output of the processor 7 is electrically connected to a video display 8. The light-position sensor 6 produces an output signal having characteristics that depend upon positions of images of the primary light sources 1a–1d as affected by the subject lens L and as sensed by the light-position sensor 6. Upon receiving the output signal from the light-position sensor 6, the processor 7 calculates a value of the refractive power and values of other parameters of a subject lens as described below. The optical data for the subject lens which have been calculated by the computer 7 are displayed on the display 8.

Figure 3:
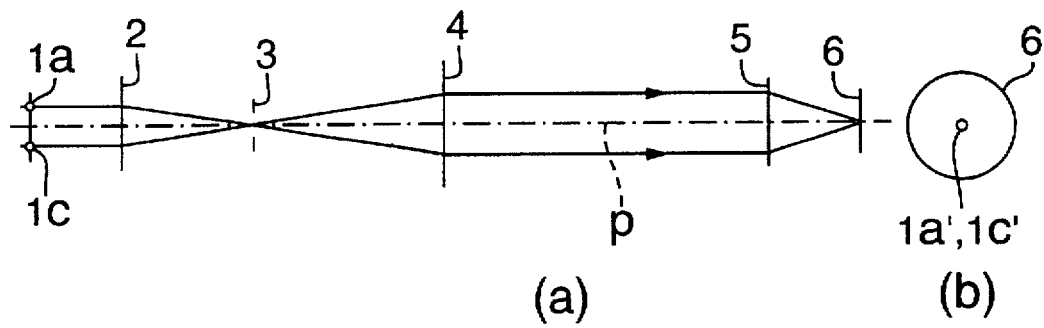
FIG. 3(a) schematically shows how light from certain primary light sources passes through the refractive-power measurement subsystem of the FIG.-1 embodiment when a subject lens is not inserted in the light path for measurement.
FIG. 3(b) schematically shows the location on the light-position sensor on which the light fluxes shown in FIG. 3(a) impinge.
Figure 4:
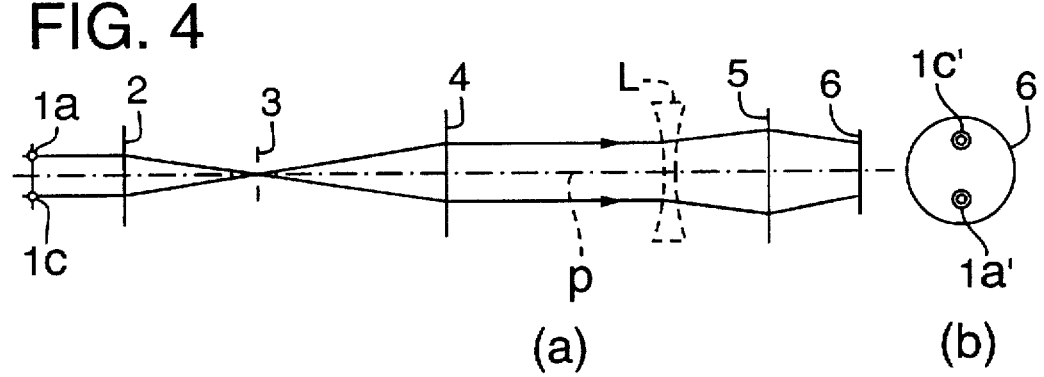
FIG. 4(a) schematically shows how light from certain primary light sources passes through the refractive-power measurement subsystem of the FIG.-1 embodiment when a concave subject lens is inserted in the light path for measurement.
FIG. 4(b) schematically shows the locations on the light-position sensor on which the light fluxes shown in FIG. 4(a) impinge.
Figure 5:
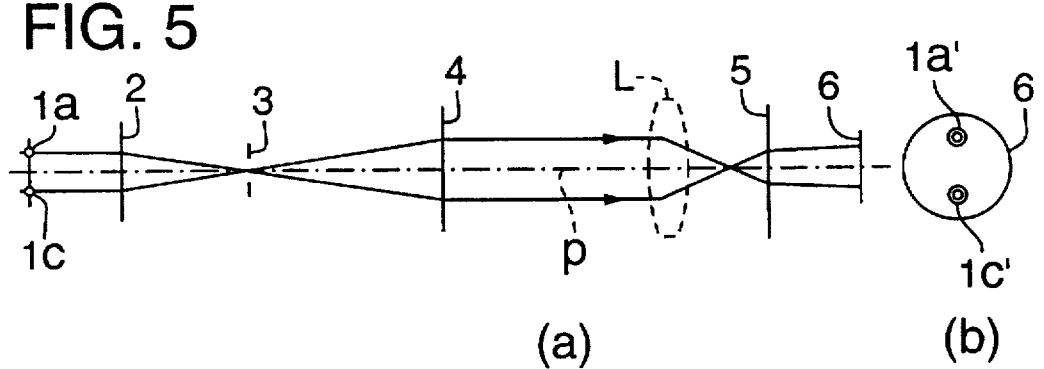
FIG. 5(a) schematically shows how light from certain primary light sources passes through the refractive-power measurement subsystem of the FIG.-1 embodiment when a convex subject lens is inserted in the light path for measurement.
FIG. 5(b) schematically shows the locations on the light-position sensor on which the light fluxes shown in FIG. 5(a) impinge.

More specifically, the subject lens L is axially placed in the vicinity of the front focal point of the imaging lens 5. Reference is made to FIGS. 3(a)–3(b), 4(a)–4(b), and 5(a)–5(b), showing representative results obtained with two primary light sources 1a and 1c when no subject lens L is placed in such a manner, when the subject lens L is concave, and when the subject lens L is convex, respectively. FIGS. 3(a), 4(a), and 5(a) depict representative ray traces, and FIGS. 3(b), 4(b), and 5(b) schematically depict primary light-source images 1a', 1c' on the light-position sensor 6.

In order to facilitate measurement of various lenses having a wide range of refractive power, the imaging lens 5 can have a variable focal length, thus providing variable magnification.

In FIG. 3(a), light fluxes from the primary light sources 1a, 1c are focused by the condenser lens 2 on the pinhole 3a. After the light fluxes have passed through the pinhole 3a, they are refracted into parallel light fluxes by the collimator lens 4, and primary light-source images 1a', 1c' are then formed on the surface of the light-position sensor 6 by the imaging lens 5. As described above, the light-position sensor 6 is positioned at the rear focal point of the imaging lens 5. Consequently, the primary light-source images 1a', 1c' are superimposed at the primary optical axis p, as shown in FIG. 3(b).

In FIG. 4(a), a concave subject lens L is axially disposed between the collimator lens 4 and the imaging lens 5. Light fluxes propagating from the primary light sources 1a, 1c are focused by the condenser lens 2 on the pinhole 3a. After passing through the pinhole 3a, the light fluxes are refracted into parallel fluxes by the collimator lens 4. The parallel fluxes enter the subject lens L by which they are diverged according to the refractive power of the subject lens L, and finally form primary light-source images 1a', 1c' on the surface of the light-position sensor 6 by means of the imaging lens 5.

As shown in FIG. 4(b), the divergent action of the subject lens L causes the primary light-source images 1a', 1c' not to form on the primary optical axis p. Rather, the primary light-source images are separated from each other and from the primary optical axis p by distances that are proportional to the refractive power of the subject lens L. Also, as shown in FIG. 4(b), the primary light-source images 1a', 1c' are blurred and their vertical relationship to each other is inverted relative to the vertical relationship of the corresponding primary light sources 1a, 1c.

In FIG. 5(a), a convex subject lens L is axially disposed between the collimator lens 4 and the imaging lens 5. Parallel light fluxes from the collimator lens enter the subject lens L by which they are converged according to the refractive power of the subject lens L, and finally form primary light-source 1a', 1c' on the light-position sensor 6 by means of the imaging lens 5.

As shown in FIG. 5(b), the convergent action of the subject lens L causes the primary light-source images 1a', 1c' not to form on the primary optical axis p. Rather, the primary light-source images are separated from each other and from the primary optical axis p by distances that are proportional to the refractive power of the subject lens L Also, as shown in FIG. 5(b), the primary light-source images 1a', 1c' are blurred and their vertical relationship to each other is the same as the vertical relationship of the corresponding primary light sources 1a, 1c.

Figure 6:
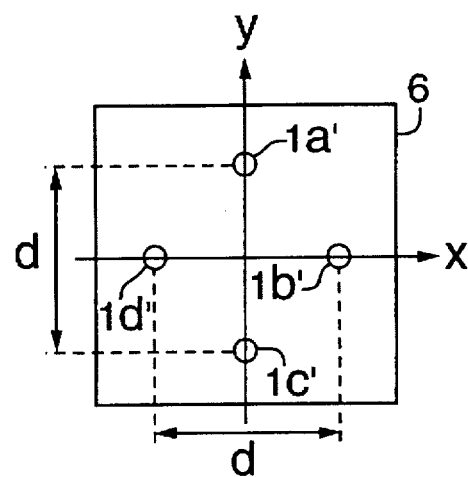
FIG. 6 schematically depicts the locations of primary-light-source images on the surface of the light-position sensor when the subject lens being measured by the refractive-power measurement subsystem of the FIG.-1 embodiment is a convex spherical lens.

FIG. 6 schematically depicts the positions of primary light-source images 1a'–1d' that form on the light-position sensor 6 whenever the subject lens L is spherical (i.e., having a single focal point) and convex. As can be seen, the distance d on the light-position sensor 6 between one pair of opposing primary light-source images 1a' and 1c' is equal to the distance d between the other pair of opposing primary light-source images 1a', 1d'.

As discussed above, the light-position sensor 6 is situated at the rear focal point of the imaging lens 5, and the subject lens L is situated, on a plane orthogonal to the primary optical axis p, substantially at the front focal point of the imaging lens 5. Whenever the distances between primary light-source images 1a', 1c', and between primary light-source images 1a', 1d' are both d, the corresponding distances between opposing centers of light flux from the primary light sources 1a, 1c and 1b, 1d at the plane of the subject lens L are both $d_0$. If the focal length of the lens 5 is f and the refractive power of the subject lens L is D (Diopter), then the following equation is applicable:

$$d=d_0 \cdot f \cdot (D/1000) \tag{1}$$

As also discussed above, whenever the subject lens L is spherically concave, the vertical and horizontal positions of the primary light-source images 1a', 1c' and 1b', 1d' are inverted relative to when the subject lens L is spherically convex. Thus, the distance d between opposing primary light-source images 1a', 1c' and 1a', 1d' is proportional to the refractive power D of the subject lens L.

In the following discussion, for the sake of simplicity, $d_0 \cdot f/1000=1$ shall be regarded as a proportionality constant.

Figure 7:
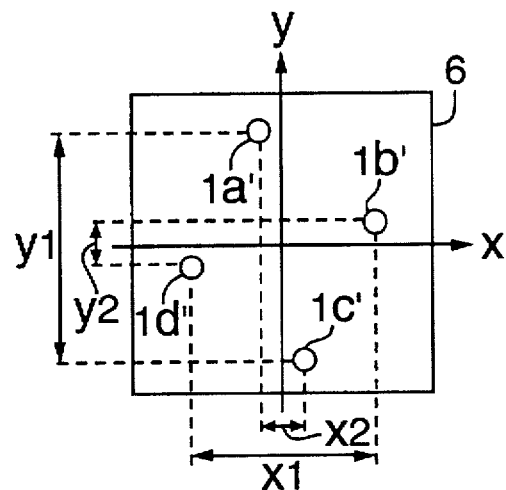
FIG. 7 schematically depicts the locations of primary-light-source images on the surface of the light-position sensor when the subject lens being measured by the refractive-power measurement subsystem of the FIG.-1 embodiment includes a cylindrical refractive surface.

Whenever the subject lens L has a refractive surface including a cylindrical surface, a representative pattern of the primary light-source images 1a'–1d' on the light-position sensor 6 is shown schematically in FIG. 7. The distance $((y1)^2+(x2)^2)^{1/2}$ between the opposing primary light-source images 1a', 1c' is different from the distance $((x1)^2+(y2)^2)^{1/2}$ between the opposing primary light-source images 1a', 1d'. Furthermore, the pattern of primary light-source images is typically rotated from that of a similar spherical lens and are thus inclined by an angle relative to the x and y axes in a direction corresponding with the direction of the primary meridian of the cylindrical lens. In other words, the opposing primary light-source images 1a', 1c' are inclined by an angle relative to the y axis (it will be recalled that these primary light-source images 1a', 1c' were situated on the y axis when the subject lens L was a spherical lens), and the opposing primary light-source images 1a', 1d' are inclined by the same angle relative to the x axis (it will be recalled that these primary light-source images 1a', 1d' were situated on the x axis when the subject lens was a spherical lens).

Where y1 is the distance along the y axis and x2 is the distance along the x axis between the pair of primary light-source images 1a' and 1c', x1 is the distance along the x axis and y2 is the distance along the y axis between the pair of primary light-source images 1b' and 1d', θ is the direction of the primary meridian axis of the subject lens L, $D_1$ is the diopter in the direction of one primary meridian of the subject lens, and $D_2$ is the diopter in the direction of the other primary meridian of the subject lens, the following equations (2) through (4) are applicable:

$$D_1+D_2=x1+y1 \quad (2)$$

$$D_1^2+D_2^2=(x1)^2+(x2)^2+(y1)^2+(y2)^2 \quad (3)$$

$$x2=-(y2)(\sin \theta)(\cos \theta)(D_1-D_2) \quad (4)$$

When equations (2) through (4) are solved for θ, $D_1$, and $D_2$, the following equations are derived:

$$D_1=[(x1+y1)+[(x1-y1)^2+2(x2)^2+2(y2)^2]^{1/2}]/2 \quad (5)$$

$$D_2=[(x1+y1)-[(x1-y1)^2+2(x2)^2+2(y2)^2]^{1/2}]/2 \quad (6)$$

$$\theta=[\sin^{-1}(-2(x2)/(D_1-D_2)/(y2))]/2 \quad (7)$$

Figure 8:
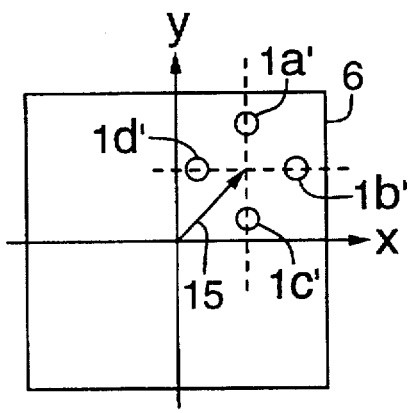
FIG. 8 schematically depicts the locations of primary-light-source images on the surface of the light-position sensor when the subject lens being measured by the refractive-power measurement subsystem of the FIG.-1 embodiment is eccentric.

FIG. 8 schematically illustrates a representative pattern formed by four primary light-source images 1a'–1d' on the light-position sensor 6 whenever the subject lens L is eccentric. As can be seen, the primary light-source images are collectively shifted a distance (as indicated by an arrow 15) on the surface of the light-position sensor 6 relative to, e.g., FIG. 6. The magnitude of the shift is proportional to the degree of eccentricity (corresponding with the so-called prismatic diopter in an eyeglass lens) of the subject lens L.

Incidentally, the prismatic diopter in an eyeglass lens, by way of example, refers to the amount of eccentricity, at a distance of one meter from the lens, imparted to rays passing through the lens. The relationship between the prismatic diopter Pr of a lens, the refractive power D (Diopter) of the lens, and the eccentricity displacement h (in centimeters) from the optical center of the lens is expressed by the following equation (8):

$$Pr=h \cdot D \quad (8)$$

Thus, there is a one-to-one correlation between the prismatic diopter Pr of a lens (relative to the degree of eccentricity) and the eccentricity distance h (relative to the degree of eccentricity) from the optical center of the lens.

As with a single-focal-point lens, the average displacement of the coordinates of the primary light-source images 1a'–1d' on the light-position sensor 6 is determined. The magnitude of this average displacement corresponds to the degree of eccentricity of the subject lens. Thus, with an eccentric lens, the degree of eccentricity can be determined from the position coordinates, on the light-position sensor 6, of the primary light-source images 1a'–1d'.

Whenever the refractive powers of two individual subject lenses are equal but have opposite sign, the distance between an opposing pair of primary light-source images formed on the surface of the light-position sensor 6 will be the same for each lens. Consequently, it is necessary to pay attention to the relative positions of opposing primary light-source images (compared to the relative positions of the opposing primary light sources) in order to discern whether the subject lens L is concave or convex. For example, if the positional relationship of the primary light-source images 1a', 1c' corresponding to the primary light sources 1a, 1c is inverted (in the vertical direction), as shown in FIG. 4(b), then the subject lens is a concave lens. Conversely, if the positional relationship of the primary light-source images 1a', 1c' corresponding to the primary light sources 1a, 1c is the same as the positional relationship of the primary light sources 1a, 1c, as shown in FIG. 5(b), then the subject lens is a convex lens.

Rather than simultaneously turning on all the primary light sources 1a–1d to produce primary light fluxes, one can discern whether the subject lens is concave or convex by sequentially (serially) energizing the primary light sources 1a–1d.

Therefore, using the refractive power measurement subsystem as described generally above, one can quickly and easily measure the refractive power of a subject lens. Such a measurement can be performed without having to employ any moving parts in the subsystem. When performing a measurement of refractive power of a subject lens, the positions of the primary light-source images are determined relative to the positions of such images when no subject lens is disposed between the collimator lens and the imaging lens.

Figure 9:
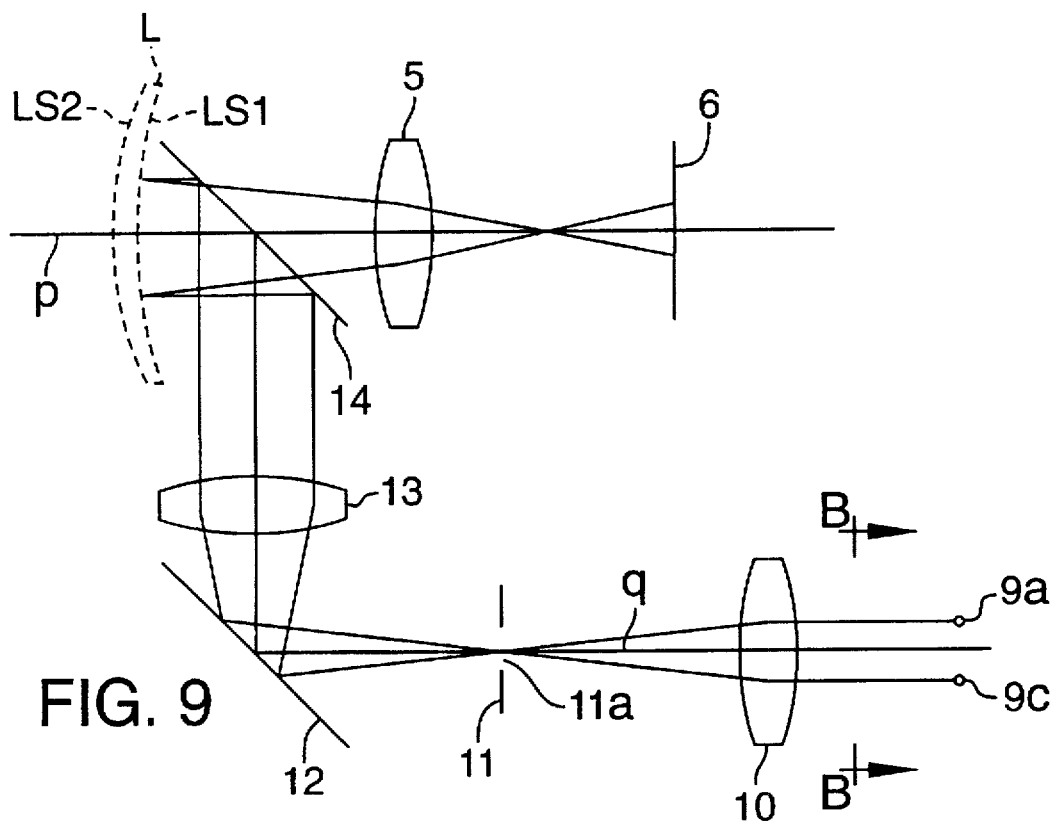
FIG. 9 is an optical diagram showing general aspects of the curvature-radius measurement subsystem of the FIG.-1 embodiment.

FIG. 9 schematically depicts general aspects of the curvature-radius measurement subsystem Y shown in FIG. 1. Thus, according to a preferred embodiment, the curvature-radius measurement subsystem Y comprises secondary light sources 9a–9d, a condenser lens 10, a pinhole 11a defined by an aperture stop 11, a mirror 12, a collimator lens 13, a beam splitter 14, and the imaging lens 5. As shown in FIG. 1, the curvature-radius measurement subsystem also comprises the light-position sensor 6, the processor 7, and the display 8. The secondary light sources 9a–9d, the condenser lens 10, the pinhole 11a, the mirror 12, the collimator lens 13, the beam splitter 14, the imaging lens 5, and the light-position sensor 6 are all situated on a secondary optical axis q. Because both subsystems preferably utilize the same light-position sensor 6, the axes p, q are preferably separate from each other over at least part of their lengths. The axes p, q are preferably coaxial through the imaging lens 5 to the light-position sensor 6.

Figure 10:
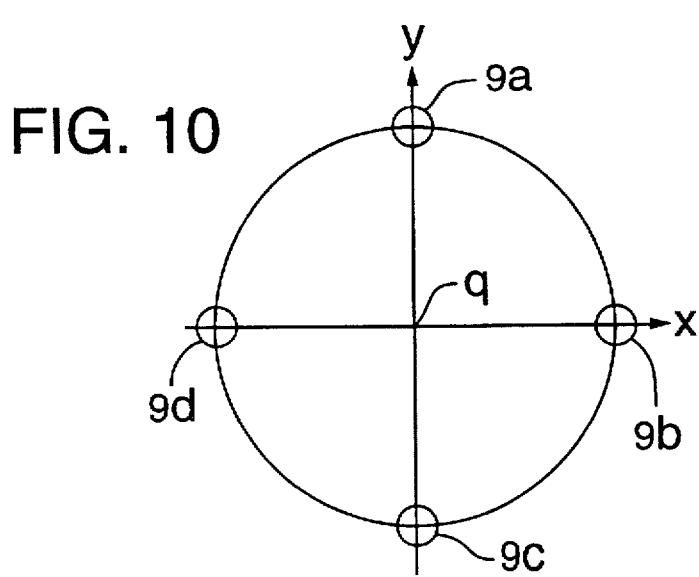
FIG. 10 schematically depicts, along the line B—B in FIG. 9, the relative positions of the secondary light sources of the curvature-radius measurement subsystem shown in FIG. 9.

FIG. 10 provides a transverse profile along the line B–B' of FIG. 9 showing the preferred arrangement of the secondary light sources 9a–9d. As can be seen, the secondary light sources 9a–9d are situated, respectively, at equilateral positions on a circle centered on and perpendicular to the secondary optical axis q. Preferably, two secondary light 9a, 9c are situated on a y axis vertically intersecting the secondary optical axis q, and two other secondary light sources 9b, 9d are situated on an x axis horizontally intersecting the secondary optical axis q.

Referring further to FIG. 9, the condenser lens 10 is separated from the secondary light sources 9a–9d by a preset distance. The pinhole 11a is situated at the rear focal point of the condenser lens 10. The collimator lens 13 is situated, on the opposite side of the pinhole 11a from the condenser lens 10, at the front focal point of the collimator lens 13. The secondary optical axis q between the pinhole 11a and the collimator lens 13 is effectively bent by the mirror 12.

A beam splitter 14, such as a half-mirror, is situated on the opposite side of the collimator lens 13 from the pinhole 11a at the intersection of the secondary optical axis q and the primary optical axis p of the refractive power measurement subsystem. In other words, the beam splitter 14 is situated in the light path between the subject lens L and the imaging lens 5, and presents a location at which the axes p, q become coaxial. The axial location of the pinhole 11a is optically conjugate with the axial location of the light-position sensor 6 by means of the collimator lens 13 and the imaging lens 5. In addition, the beam splitter 14 can be mounted so that it can be freely inserted into and retracted from the light path.

Using the curvature-radius measurement subsystem configured as described above, the radius of curvature can be measured of a surface LS1 of the subject lens L situated on or about the location of the front focal point of the imaging lens 5. FIGS. 11a–11b, 12a–12b, and 13a–13b pertain to use of this subsystem for measuring the radius of curvature of a surface LS1, oriented toward the imaging lens 5, that is flat, that is convex, or that is concave, respectively. Although, in FIGS. 11a–11b, 12a–12b, and 13a–13b, secondary light sources 9a, 9c are shown, it will be understood that light from secondary light sources 9b, 9d exhibit similar behavior as light from the secondary light sources 9a, 9c.

Figure 11A:
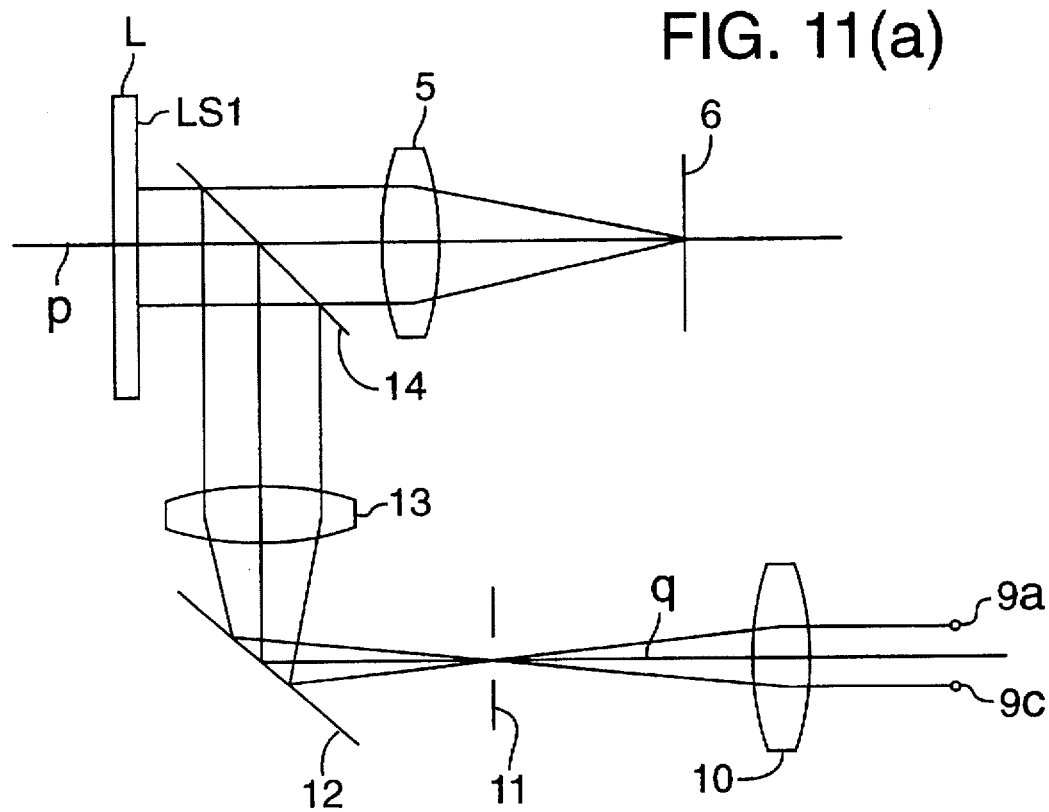
FIG. 11(a) schematically shows how light from certain secondary light sources passes through the curvature-radius measurement subsystem of FIG. 9 when the subject surface being measured is planar (i.e., has substantially no radius of curvature).
Figure 11B:
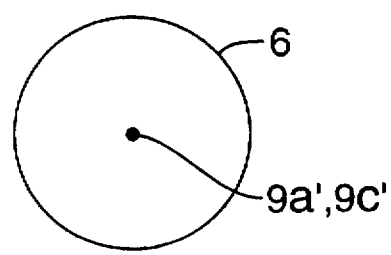
FIG. 11(b) schematically shows the location on the light-position sensor on which the light fluxes shown in FIG. 11(a) impinge.

In the scheme shown in FIG. 11a, it can be seen that the subject lens L presents a surface LS1 toward the imaging lens 5 that is flat. Consequently, light fluxes impinging upon the surface LS1 from the beam splitter 14 parallel to the primary axis p also reflect from the surface LS1 parallel to the primary axis p. More specifically, FIG. 11a shows that light fluxes propagating from the secondary light sources 9a, 9c are focused by the condenser lens 10 on the pinhole 11a. After passing through the pinhole 11a and being reflected by the mirror 12, the fluxes enter the collimator lens 13. The fluxes are refracted into parallel fluxes by the collimator lens 13 and reflected by the beam splitter 14. The fluxes then impinge upon the surface LS1 of the subject lens L. After reflection from the surface LS1 of the subject lens L, the fluxes pass through the beam splitter 14 and converge on the light-position sensor 6 by the imaging lens 5. Since the surface LS1 of the subject lens L is flat in FIG. 11a, incident light that reflects from the surface LS1 toward the imaging lens 5 is parallel. Because the light-position sensor 6 is situated at the rear focal point of the imaging lens 5, secondary light-source images 9a', 9c' are formed on the primary optical axis p, as shown in FIG. 11(b).

Figure 12A:
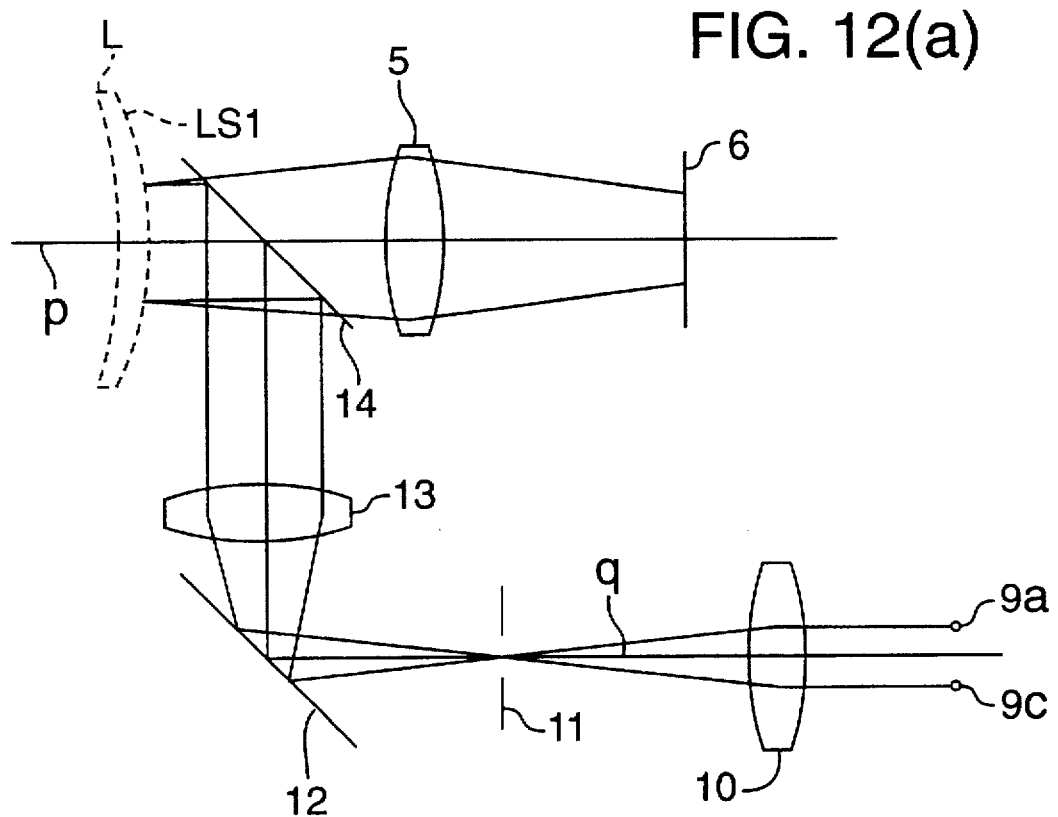
FIG. 12(a) schematically shows how light from certain secondary light sources passes through the curvature-radius measurement subsystem of FIG. 9 when the subject surface being measured is convex.

FIG. 12a is similar to FIG. 11a except that, in FIG. 12a, the subject lens L presents a convex surface LS1 toward the imaging lens 5. More specifically, fluxes refracted into parallel fluxes by the collimator lens 13 are reflected by the beam splitter 14 so as to impinge on the surface LS1. Upon reflection from the surface LS1, the fluxes become divergent. The fluxes then pass through the beam splitter 14 and imaging lens 5 to form secondary light-source images 9a', 9c' on the surface of the light-position sensor 6.

Figure 12B:
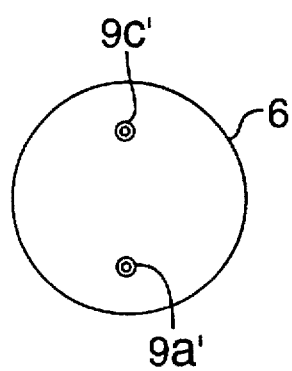
FIG. 12(b) schematically shows the locations on the light-position sensor on which the light fluxes shown in FIG. 12(a) impinge.

FIG. 12(b) shows the positions of the secondary light-source images 9a', 9c' on the light-position sensor 6. Since the surface LS1 of the subject lens L is convex, light flux reflected from the surface LS1 is divergent. Consequently, even though the light-position sensor 6 is located at the rear focal point of the imaging lens 5, the secondary light-source images 9a', 9c' do not form on the primary optical axis p. Rather, the secondary light-source images 9a', 9c' are separated from each other by a distance, transverse to the primary axis p, that is proportional to the radius of curvature of the surface LS1. In addition, as shown in FIG. 12(b), the secondary light-source images 9a', 9c' (as well as secondary light-source images 9b' and 9d', not shown) are blurred and the vertical relationship of the secondary light-source images 9a', 9c' to each other is inverted relative to the vertical relationship of the corresponding secondary light sources.

Figure 13A:
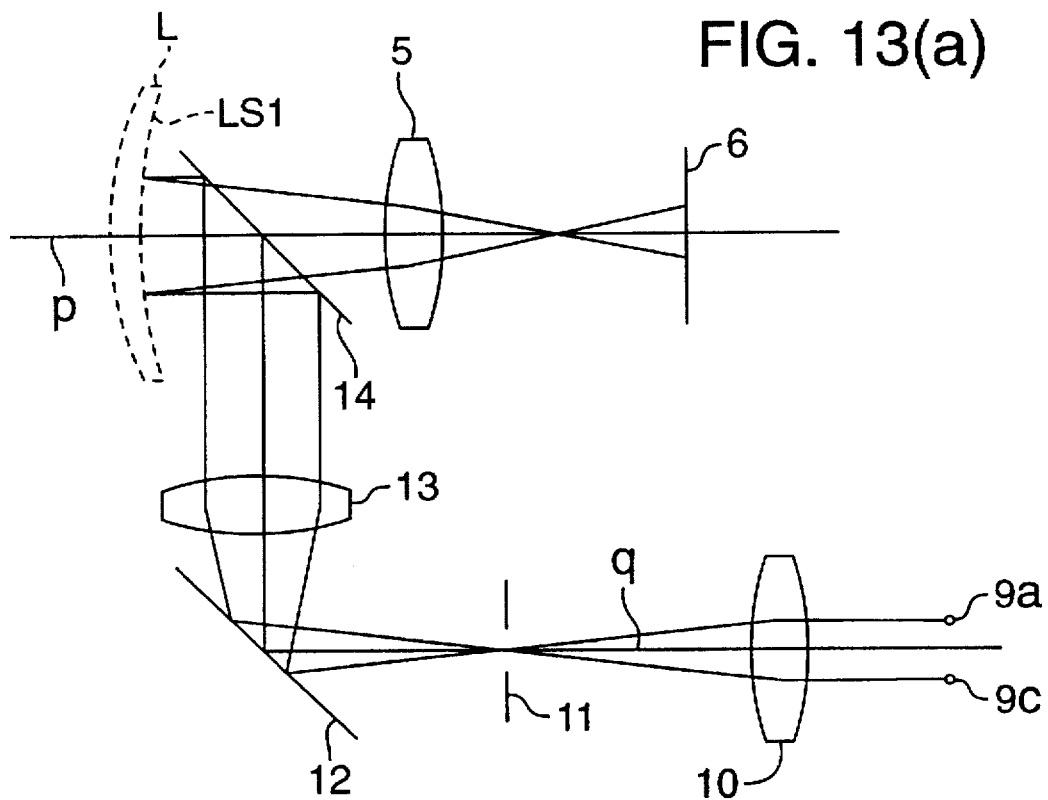
FIG. 13(a) schematically shows how light from certain secondary light sources passes through the curvature-radius measurement subsystem of FIG. 9 when the subject surface being measured is concave.

FIG. 13a is similar to FIG. 11a except that, in FIG. 13a, the subject lens L presents a concave surface LS1 toward the imaging lens 5. More specifically, light fluxes refracted into parallel fluxes by the collimator lens 13 are reflected by the beam splitter 14 so as to impinge on the surface LS1. Upon reflection from the surface LS1, the fluxes become convergent. The fluxes then pass through the beam splitter 14 and imaging lens 5 to form secondary light-source images on the light-position sensor 6.

Figure 13B:
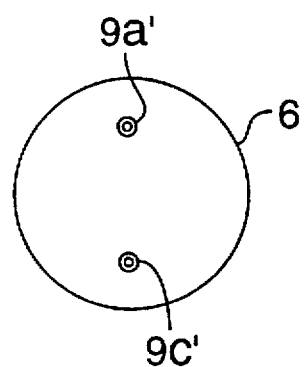
FIG. 13(b) schematically shows the locations on the light-position sensor on which the light fluxes shown in FIG. 13(a) impinge.

FIG. 13(b) shows the positions of the secondary light-source images 9a', 9c' on the light-position sensor 6. Since the surface LS1 of the subject lens L is concave, light flux reflected from the surface LS1 is convergent. Consequently, even though the light-position sensor 6 is located at the rear focal point of the imaging lens 5, the secondary light-source images 9a', 9c' do not form on the primary optical axis p. Rather, the secondary light-source images 9a', 9c' are separated from each other by a distance, transverse to the primary axis p, that is proportional to the radius of curvature of the surface LS1. In addition, as shown in FIG. 13(b), the secondary light-source images 9a', 9c' (as well as secondary light-source images 9b' and 9d', not shown are blurred and the vertical relationship of the secondary light-source images 9a', 9c' to each other is the same as the vertical relationship of the corresponding secondary light sources.

The output of the light-position sensor 6 is electrically connected via a processor 7 to a display device 8. The processor 7 receives from the light-position sensor 6 a signal (position signal) corresponding to the positions of the secondary light-source images 9a–9d'. From the position signal, the processor 7 calculates the radii of curvature $R_1$, $R_2$ and the angle θ of the direction of the meridian lines for the surface LS1 of the subject lens L, and then displays the calculated curvature-radius data on the display device 8.

In the manner as described above, the refractive-power measurement subsystem and the curvature-radius measurement subsystem preferably share the same imaging lens 5 and the same light-position sensor 6.

Similar to the scheme shown in FIG. 6, whenever the surface LS1 is spherical, the measured distance on the light-position sensor 6 between the coordinates of the secondary light-source images 9a', 9c' of the pair of opposing secondary light sources 9a, 9c, respectively, is equal to the measured distance on the light-position sensor 6 between the coordinates on the light-position sensor 6 of the secondary light-source images 9b', 9d' of the pair of opposing secondary light sources 9b, 9d, respectively. As with the refractive-power measurement subsystem, when the radii of curvature LS1 of two different subject lenses are equal but have opposite sign, the distance between opposing pairs of corresponding secondary light-source images on the light-position sensor 6 will be the same for each surface. Consequently, it is necessary to pay attention to the positional relationship of opposing secondary light-source images relative to the positional relationship of corresponding secondary light sources in order to discern whether the surface LS1 is concave or convex. For example, if the positional relationship of the secondary light-source images 9a', 9c' is vertically inverted relative to the positional relationship of the corresponding secondary light sources 9a, 9c, respectively, then the surface LS1 is a convex surface oriented toward the imaging lens 5. Conversely, if the positional relationship of the secondary light-source images 9a', 9c' is the same as the positional relationship of the corresponding secondary light sources 9a, 9c, respectively, then the surface LS1 is a concave surface oriented toward the imaging lens 5.

Hence, when performing a measurement of the radius of curvature of a surface of a subject lens, the positions of the secondary light-source images are determined relative to the positions of such images when the subject surface is planar.

Rather than illuminate all the secondary light sources 9a–9d simultaneously, it is possible, for example, to illuminate each secondary light source serially and still determine whether the surface LS1 is a concave or a convex surface oriented toward the imaging lens 5.

As described above with respect to the primary light sources, the secondary light sources can be any of various "point sources" of light, and can have adjustable intensity. Also, as described above with respect to the primary light sources, the number of secondary light sources can be fewer or greater than the four shown herein, so long as they are operable to provide, either serially or simultaneously, light fluxes that emanate from more than one non-axial location in a plane perpendicular to the corresponding optical axis. Furthermore, the secondary light sources produce light having a wavelength(s) that is either substantially the same as or different from the wavelength(s) of the primary light sources.

As can be ascertained from the foregoing, it is possible to quickly and easily measure the radius of curvature of a subject lens using the curvature-radius measurement subsystem without having to employ any moving parts.

As with the refractive-power measurement subsystem, when an eccentric subject lens L is being measured for radius of curvature using the curvature-radius measurement subsystem, the pattern formed by the secondary light-source images $9a'–9d'$ will shift on the surface of the light-position sensor 6 by a certain distance relative to a pattern formed by a subject lens having a spherical surface. The amount of this shift is proportional to the amount of eccentricity of the subject lens L. In performing such a measurement, the average of the coordinates of the secondary light-source images $9a'–9d'$ on the light-position sensor 6 is determined; the amount of shift from the origin (i.e., from where the axis p passes through the light-position sensor 6) exhibited by the average of the coordinates is proportional to the degree of eccentricity of the subject lens L.

In general, where R is the radius of curvature of the surface LS1 of the subject lens L, the surface LS1 behaves as a lens with a focal length of f=R/2 with respect to light reflected from the lens L. In other words, when the surface LS1 is concave, it behaves as a convex lens having a focal length of f=R/2 (R in millimeters); when the surface LS1 is convex, it behaves as a concave lens having a focal length of f=R/2. Substituting for diopter, D=1000/f=2000/R.

Consequently, equations (1) through (8) described above in relation to refractive-power measurement also can be applied to curvature-radius measurement. When measurement results are displayed, they can be converted to R=2000/D.

The radii of curvature of most eyeglass lenses are not usually very small (i.e., the surface refractive power of most such lenses are relatively small). In contrast, the radii of curvature of most contact lenses are relatively small (i.e., the surface refractive power of most contact lenses are relatively large). As a result, whenever there is a possibility that one or more light-source images will be situated outside the bounds of the surface of the light-position sensor 6, the imaging lens 5 can be configured as a variable-focal length optical system (including such systems in which the magnification is changed by using different imaging lenses for different focal lengths). Also, the distance of the light sources from the corresponding axis can be adjustable to permit measurement of lenses of widely varying size using the same instrument.

In addition to light reflected from the surface LS1, light reflected from the surface LS2 can also enter the light-reception surface of the light-position sensor 6.

Consequently, so long as there is a significant difference between the radius of curvature of surface LS1 and the radius of curvature of surface LS2, it is possible to simultaneously measure the radii of curvature of both surfaces. In order to realize this simultaneous measurement, it is preferable for the light-position sensor 6 to be an element such as a charged-coupled device (CCD).

On the other hand, the closer the radius of curvature of surface LS1 is to the radius of curvature of surface LS2, the more difficult it is to discriminate among the light-source images corresponding to each surface because the light-source images of the same light source become superimposed on the light-position sensor 6. In such a case, it is preferred to perform some kind of treatment, such as applying a black coating to the surface LS2 to ensure that either virtually no reflected light from the surface LS2 enters the light-position sensor 6 or that, even if some light from the surface LS2 does enter the light-position sensor 6, the intensity of such light is sufficiently damped.

Furthermore, to remove effects from any nuisance light that might be present, a filter can be employed at the rear (i.e., on the position-sensor side) of the imaging lens 5 to block the nuisance light. Alternatively, the beam splitter 14 can be modified to block nuisance light.

Because an apparatus according to the present invention comprises both a refractive-power measurement subsystem and a curvature-radius measurement subsystem, as described generally above, the refractive power and radius of curvature of a lens can be measured using a single device. In addition, such measurements can be performed quickly and easily without having to engage any moving parts.

While the invention has been described in connection with a preferred embodiment, it will be understood that the invention is not limited to that embodiment. On the contrary, the invention is intended to encompass all alternatives, modifications, and equivalents as may be included within the spirit and scope of the invention as defined by the appended claims.

What is claimed is:

1. An apparatus for measuring refractive power and radius of curvature of a subject lens, the apparatus comprising:

(a) a refractive-power measurement subsystem arranged on a primary optical axis and comprising a primary light source for generating plural primary light fluxes appearing to originate from locations symmetrically displaced from the primary optical axis on a plane perpendicular to the primary optical axis, the refractive-power measurement subsystem also comprising on the primary optical axis a condenser lens, a collimator lens, an imaging lens, and a single stationary light-position sensor, the refractive-power measurement subsystem being for measuring the refractive power of a subject lens disposed on the primary optical axis between the collimator lens and the imaging lens by sensing the positions at which the primary light fluxes impinge on the light-position sensor as affected by refraction of the primary light fluxes passing through the subject lens, relative to positions at which the primary light fluxes impinge on the light-position sensor when no subject lens is placed between the collimator lens and the imaging lens; and (b) a curvature-radius measurement subsystem arranged on a secondary optical axis and comprising a secondary light source for generating plural secondary light fluxes appearing to originate from locations symmetrically displaced from the secondary optical axis on a plane perpendicular to the secondary optical axis, the curvature-radius measurement subsystem also comprising on the secondary optical axis a condenser lens, a collimator lens, an imaging lens, and the light-position sensor, the curvature-radius measurement subsystem being for measuring the radius of curvature of a subject surface, facing the imaging lens, of the subject lens situated between the collimator lens and the imaging lens by sensing the positions at which the secondary light fluxes impinge on the light-position sensor as affected by reflection of the secondary light fluxes from the surface of the subject lens, relative to positions at which the secondary light fluxes impinge on the light-position sensor when the subject surface is planar.

2. The apparatus of claim 1, wherein the primary light source produces four primary light fluxes appearing to originate from equilaterally positioned locations relative to the primary optical axis on the plane perpendicular to the primary optical axis.

3. The apparatus of claim 1, wherein the secondary light source produces four secondary light fluxes appearing to originate from equilaterally positioned locations relative to the secondary optical axis on the plane perpendicular to the secondary optical axis.

4. The apparatus of claim 3, wherein the primary light source produces four primary light fluxes appearing to originate from equilaterally positioned locations relative to the primary optical axis on the plane perpendicular to the primary optical axis.

5. The apparatus of claim 1, wherein the light-position sensor is a charge-coupled device.

6. The apparatus of claim 1, further comprising a beam splitter situated on the primary optical axis between the subject lens and the imaging lens.

7. The apparatus of claim 6, wherein the imaging lens of the refractive-power measurement subsystem is the same as the imaging lens of the curvature-radius measurement subsystem.

8. The apparatus of claim 7, wherein the imaging lens has a variable focal length.

9. The apparatus of claim 7, wherein the primary optical axis intersects the secondary optical axis at the beam splitter.

10. The apparatus of claim 9, wherein the primary optical axis is coaxial with the secondary optical axis from the beam splitter to the light-position sensor.

11. The apparatus of claim 1, wherein the primary and secondary light sources are selected from a group consisting of LEDs and laser diodes.

12. The apparatus of claim 1, wherein the primary and secondary light sources have substantially the same wavelength.

13. The apparatus of claim 1, wherein the locations on the light-position sensor of the refractive-power measurement subsystem at which the primary light fluxes impinge are separated from each other and from the primary optical axis by distances that are proportional to the refractive power of the subject lens.

14. The apparatus of claim 1, wherein the locations on the light-position sensor of the curvature-radius measurement subsystem at which the secondary light fluxes impinge are separated from each other and from the secondary optical axis by distances that are proportional to the radius of curvature of the subject surface.

15. The apparatus of claim 1, further comprising a processor connected to the light-position sensor, and a display connected to the processor, the processor being for computing refractive power and radius of curvature from the positions at which primary and secondary light fluxes impinge on the light-position sensor, and the display being for displaying the results of computations performed by the processor.

16. The apparatus of claim 1, wherein the refractive-power subsystem provides data on the decentering of the subject lens and the direction of the principal meridians of the subject lens.

17. The apparatus of claim 1, wherein the curvature-radius measurement subsystem provides data on the decentering of the subject lens and the direction of the principal meridians of the subject surface.

18. An apparatus according to claim 1, wherein the refractive-power measurement subsystem further comprises a stop, defining an aperture, axially situated between the condenser lens and the collimator lens of the subsystem.

19. An apparatus for measuring refractive power and radius of curvature of a subject lens, the apparatus comprising:

(a) a refractive-power measurement subsystem arranged on a primary optical axis and comprising a primary light source for generating plural primary light fluxes appearing to originate from locations symmetrically displaced from the primary optical axis on a plane perpendicular to the primary optical axis, the refractive-power measurement subsystem also comprising on the primary optical axis a condenser lens, a collimator lens, an imaging lens, and a single stationary light-position sensor, the refractive-power measurement subsystem being for measuring the refractive power of a subject lens disposed on the primary optical axis between the collimator lens and the imaging lens by sensing the positions at which the primary light fluxes impinge on the light-position sensor as affected by refraction of the primary light fluxes passing through the subject lens, relative to positions at which the primary light fluxes impinge on the light-position sensor when no subject lens is placed between the collimator lens and the imaging lens; and (b) a curvature-radius measurement subsystem arranged on a secondary optical axis and comprising a secondary light source for generating plural secondary light fluxes appearing to originate from locations symmetrically displaced from the secondary optical axis on a plane perpendicular to the secondary optical axis, the curvature-radius measurement subsystem also comprising on the secondary optical axis a condenser lens, a collimator lens, an imaging lens, the light-position sensor, and a stop defining an aperture situated between the condenser lens and the collimator lens of the subsystem, the curvature-radius measurement subsystem being for measuring the radius of curvature of a subject surface, facing the imaging lens, of the subject lens situated between the collimator lens and the imaging lens by sensing the positions at which the secondary light fluxes impinge on the light-position sensor as affected by reflection of the secondary light fluxes from the surface of the subject lens, relative to positions at which the secondary light fluxes impinge on the light-position sensor when the subject surface is planar.

* * * * *

UNITED STATES PATENT AND TRADEMARK OFFICE
CERTIFICATE OF CORRECTION

PATENT NO. : 5,742,381

DATED : April 21, 1998

INVENTOR(S) : Yasunori Ueno

It is certified that error appears in the above-identified patent and that said Letters Patent is hereby corrected as shown below:

Column 6, line 4, insert --images-- after "light-source" and before "1a'".

Column 6, line 11, "Lo" should be --L.--.

Column 6, lines 23 and 31, "1a'" should be --1b'--.

Column 6, line 34, insert --imaging-- after the second occurrence of "the" and before "lens 5".

Column 6, lines 44, 54, 64, and 66, "1a'" should be --1b'--.

Column 8, line 45, insert --sources-- after "light" and before "9a".

Column 10, line 18, insert an end parenthesis --)-- after "shown".

Column 10, line 26, "9a" should be --9a'--.

Column 11, line 15, insert --can-- after "sources" and before "produce".

Signed and Sealed this

Twentieth Day of July, 1999

Attest:

Q. TODD DICKINSON

*Attesting Officer*     *Acting Commissioner of Patents and Trademarks*